US011300215B2

(12) United States Patent  
Olberding et al.

(10) Patent No.: US 11,300,215 B2  
(45) Date of Patent: Apr. 12, 2022

(54) FLUID CONTROL VALVE HAVING DISCRETE FLOW CHANNELS ARRANGED TO EQUALIZE THE VELOCITY OF FLUID AT THE PERIMETER OF THE VALVE PORT

(71) Applicant: FISHER CONTROLS INTERNATIONAL LLC, Marshalltown, IA (US)

(72) Inventors: Jason G. Olberding, Marshalltown, IA (US); Thomas N. Gabriel, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 194 days.

(21) Appl. No.: 16/672,402

(22) Filed: Nov. 1, 2019

(65) Prior Publication Data

US 2020/0064874 A1 Feb. 27, 2020

Related U.S. Application Data

(63) Continuation of application No. 15/440,934, filed on Feb. 23, 2017, now Pat. No. 10,551,856.

(51) Int. Cl.
*F16K 47/08* (2006.01)
*F16K 11/04* (2006.01)
(Continued)

(52) U.S. Cl.
CPC .......... *F16K 11/04* (2013.01); *F16K 27/0254* (2013.01); *F16K 47/08* (2013.01);
(Continued)

(58) Field of Classification Search
CPC ... F16K 47/08; F16K 1/38; F16K 1/12; F16K 1/54; F16K 1/427; F16K 1/42; F16K 11/04; F16K 1/06; F16K 27/0254
See application file for complete search history.

(56) References Cited

U.S. PATENT DOCUMENTS 1,556,632 A * 10/1925 Rouleau ................. F16K 11/04  
                                                                             137/630.17  
3,145,064 A * 8/1964 Billeter ................... B60T 15/54  
                                                                              303/69

(Continued)

FOREIGN PATENT DOCUMENTS

JP         S58137670 A ‡ 8/1983

OTHER PUBLICATIONS

Written Opinion for PCT/US2018/017197 dated May 15, 2018.‡  
Search Report for PCT/US2018/017197 dated May 15, 2018.‡

*Primary Examiner* — Matthew W Jellett  
*Assistant Examiner* — Christopher D Ballman  
(74) *Attorney, Agent, or Firm* — Marshall, Gerstein & Borun LLP

(57) ABSTRACT

A valve body and a control valve including such a valve body, the valve body including an inlet, an outlet, a valve port defined therebetween, and a plurality of discrete flow channels extending between the inlet and the valve port to distribute fluid flow to the valve port in a manner that equalizes the velocity of fluid at the perimeter of the valve port. The plurality of discrete flow channels includes (i) one or more first flow channels arranged to direct a first amount of the fluid flow to a front portion of the valve port, (ii) one or more second flow channels arranged to direct a second amount of the fluid flow to a rear portion of the valve port, and (iii) one or more third flow channels arranged to direct a third amount of the fluid flow to one or both side portions of the valve port.

20 Claims, 16 Drawing Sheets

(51) Int. Cl.
  *F16K 27/02* (2006.01)
  *F16K 1/38* (2006.01)
  *F16K 1/12* (2006.01)
  *F16K 1/54* (2006.01)
  *F16K 1/42* (2006.01)
  *F16K 1/06* (2006.01)

(52) U.S. Cl.
  CPC .............. *F16K 1/06* (2013.01); *F16K 1/12* (2013.01); *F16K 1/38* (2013.01); *F16K 1/427* (2013.01); *F16K 1/54* (2013.01)

(56) References Cited

U.S. PATENT DOCUMENTS

| | | | | |
|---|---|---|---|---|
| 3,157,200 A * | 11/1964 | Rowan | F16K 39/04 | 137/625.33 |
| 3,746,049 A * | 7/1973 | O'Connor, Jr. | G01F 1/075 | 137/802 |
| 3,971,411 A * | 7/1976 | Baumann | F16K 1/54 | 137/625.3 |
| 4,022,423 A * | 5/1977 | O'Connor | F16K 47/00 | 251/127 |
| 4,397,331 A * | 8/1983 | Medlar | F16K 47/02 | 137/375 |
| 4,562,861 A ‡ | 1/1986 | Payton | F16K 15/026 | 137/493.9 |
| 4,825,906 A * | 5/1989 | Hartman | F16K 47/08 | 137/561 A |
| 5,085,246 A ‡ | 2/1992 | Griinke | F16K 17/30 | 137/504 |
| 5,730,416 A ‡ | 3/1998 | Welker | F16K 47/08 | 137/62 |
| 5,769,388 A ‡ | 6/1998 | Welker | F15D 1/04 | 137/62 |
| 5,870,896 A * | 2/1999 | Clark | F16K 1/22 | 60/670 |
| 5,924,673 A * | 7/1999 | Welker | F16K 47/08 | 251/118 |
| 6,003,551 A * | 12/1999 | Wears | F16K 1/06 | 137/625.33 |
| 6,439,267 B2 * | 8/2002 | Welker | F15D 1/04 | 137/625.28 |
| 6,715,505 B2 * | 4/2004 | Higuchi | F16K 47/04 | 137/605 |
| 6,935,371 B2 ‡ | 8/2005 | Stares | F16K 3/24 | 137/625.37 |
| 7,028,712 B2 * | 4/2006 | Wears | F16K 1/52 | 137/625.33 |
| 7,044,434 B2 ‡ | 5/2006 | Brinks | F16K 1/38 | 251/12 |
| 7,152,628 B2 * | 12/2006 | Folk | F16K 25/04 | 137/625.33 |
| 7,383,859 B2 ‡ | 6/2008 | Takahashi | F16K 1/36 | 137/625.33 |
| 8,220,775 B2 ‡ | 7/2012 | Bittner | F16K 3/246 | 251/121 |
| 8,297,314 B2 * | 10/2012 | Clark | F16K 31/402 | 137/625.27 |
| 9,046,191 B2 ‡ | 6/2015 | Davies | F16K 47/00 | |
| 9,415,645 B2 * | 8/2016 | Racine | B60C 23/003 | |
| 9,720,420 B2 ‡ | 8/2017 | Uchida | F16K 1/32 | |
| 9,890,874 B2 * | 2/2018 | Bergamini | F16K 47/08 | |
| 10,302,224 B2 * | 5/2019 | Kluz | F16K 47/08 | |
| 2008/0265195 A1 ‡ | 10/2008 | Bittner | F16K 3/246 | 251/12 |
| 2009/0283709 A1 ‡ | 11/2009 | Bey | F16K 1/12 | 251/324 |
| 2016/0116072 A1 ‡ | 4/2016 | Westwater | F16K 25/005 | 251/17 |
| 2016/0131277 A1 ‡ | 5/2016 | Kuromusha | F16K 17/105 | 137/489 |
| 2016/0327184 A1 ‡ | 11/2016 | Richardson | F16K 47/04 | |
| 2017/0268694 A1 ‡ | 9/2017 | Rivera | B05B 12/006 | |
| 2017/0350513 A1 ‡ | 12/2017 | Shen | F16K 1/385 | |

\* cited by examiner
‡ imported from a related application

FLUID CONTROL VALVE HAVING DISCRETE FLOW CHANNELS ARRANGED TO EQUALIZE THE VELOCITY OF FLUID AT THE PERIMETER OF THE VALVE PORT

CROSS-REFERENCE TO RELATED APPLICATION

This application is a continuation of U.S. patent application Ser. No. 15/440,934, entitled "Fluid Control Valve Having Discrete Flow Channels Arranged to Equalize the Velocity of Fluid at the Perimeter of the Valve Port," and filed Feb. 23, 2017, the entire disclosure of which is hereby incorporated by reference herein.

FIELD OF THE DISCLOSURE

The present disclosure generally relates to fluid flow control devices and, more particularly, to a fluid control valve having discrete flow channels arranged to equalize the velocity of fluid at the perimeter of the valve port of the valve, thereby providing a more balanced pressure profile.

BACKGROUND

Process control systems typically include various components for controlling various process parameters. For example, a fluid process control system may include a plurality of control valves for controlling flow rate, temperature, and/or pressure of a fluid flowing through the system. The end product is dependent on the accuracy of the control of these parameters, which is, in turn, dependent on the geometry and characteristics of the control valves. Control valves are, for example, specifically designed and selected to provide for particular flow capacities and pressure changes. When these characteristics are compromised, the quality of the end product may be affected.

In some applications (e.g., combustion turbine applications), it may be necessary to provide a control valve that is operable in a choked flow condition. Choked flow occurs when the velocity of fluid flowing through the control valve reaches supersonic speed (e.g., about 1070 feet per second for fuel flowing through the control valve for gas turbine electricity generation applications).

FIGS. 1 and 2 illustrate one known example of a control valve 100 that is operable in a choked flow condition. As illustrated, the control valve 100 includes a valve body 104 and a trim assembly 108 arranged in the valve body 104. The valve body 104 defines an inlet 112 and an outlet 116 connected by an annular valve port 120. The trim assembly 108 includes a seat ring 124, a seat ring retainer 128, and a valve plug 132. The seat ring 124 is arranged in the valve port 120. The seat ring retainer 128 is seated against the seat ring 124 to retain the seat ring 124 in position within the valve port 120. The valve plug 132 movably interacts with the seat ring 124 to control fluid flow through the valve port 120 (and thus the control valve 100).

The known flow control valve 100 suffers from many problems, however. Because fluid flowing through the valve port 120 tends to take the path of least resistance (i.e., the easiest route), most of the fluid flowing through the valve port 120 tends to flow through the valve port 120 at or through a front portion 136 of the perimeter of the valve port 120 (closest to a front side 140 of the seat ring 124 and a front side of the valve plug), as opposed to the rear portion 144 of the valve port 120 (opposite the front portion 136). In other words, fluid is not evenly distributed to and around the perimeter of the valve port 120 and the valve plug 132 when flowing from the inlet 112 to the outlet 116 through the valve port 120. As a result of this uneven distribution, a swirling effect is created, whereby fluid flowing through the valve port 120 at the rear portion 144 of the valve port changes direction several times before actually entering and flowing through the valve port 120. This change in direction causes a reduction in flow velocity, which also reduces the pressure of the fluid relative to the pressure of the fluid flowing through the valve port 120 at the front portion 136, thereby inducing an unbalanced velocity profile and an unbalanced pressure profile across the known control valve 100.

SUMMARY

In accordance with a first exemplary aspect, a valve body for a fluid control valve is provided. The valve body includes an inlet, an outlet, a valve port defined between the inlet and the outlet, and a plurality of discrete flow channels extending between the inlet and the valve port to distribute fluid flowing through the inlet to the valve port. The plurality of discrete flow channels include: one or more first flow channels arranged to direct a first amount of the fluid flowing through the inlet to a front portion of the valve port; one or more second flow channels arranged to direct a second amount of the fluid flowing through the inlet to a rear portion of the valve port opposite the front portion; and one or more third flow channels arranged to direct a third amount of the fluid flowing through the inlet to one or both side portions of the valve port extending between the front and rear portions.

In accordance with a second exemplary aspect, a valve body for a fluid control valve is provided. The valve body includes an inlet, an outlet, a valve port defined between the inlet and the outlet, and a plurality of discrete flow channels extending between the inlet and the valve port to distribute fluid flowing through the inlet to the valve port. The plurality of discrete flow channels include: one or more first flow channels arranged to direct a first amount of the fluid flowing through the inlet to a front portion of the valve port; one or more second flow channels arranged to direct a second amount of the fluid flowing through the inlet to a rear portion of the valve port opposite the front portion; and one or more third flow channels arranged to direct a third amount of the fluid flowing through the inlet to one or both side portions of the valve port extending between the front and rear portions. The one or more first flow channels define a first total flow area that is less than each of a second total flow area defined by the one or more second flow channels and a third total flow area defined by the one or more third flow channels.

In accordance with a third exemplary aspect, a fluid control valve operable in a choked flow condition is provided. The control valve includes a valve body defining an inlet, an outlet, and a valve port between the inlet and the outlet. The control valve also includes a plurality of discrete flow channels extending between the inlet and the valve port to distribute fluid flowing through the inlet to the valve port. The plurality of discrete flow channels includes: one or more first flow channels arranged to direct a first amount of the fluid flowing through the inlet to a front portion of the valve port; one or more second channels arranged to direct a second amount of the fluid flowing through the inlet to a rear portion of the valve port opposite the front portion; and one or more third channels arranged to direct a third amount of the fluid flowing through the inlet to one or both side portions of the valve port extending between the front and rear portions.

In further accordance with any one or more of the foregoing first, second, or third exemplary aspects, a valve body or a fluid control valve may include any one or more of the following further preferred forms.

In one preferred form, the plurality of discrete flow channels is integrally formed between the inlet and the valve port.

In another preferred form, the plurality of discrete flow channels is integrally formed between the inlet and the valve port.

In another preferred form, the plurality of discrete flow channels comprises one first flow channel, two second flow channels, and two third flow channels.

In another preferred form, the two third flow channels direct fluid flowing through the inlet to the side portions of the valve port, respectively.

In another preferred form, the inlet is oriented along an inlet axis and the outlet is oriented along an outlet axis substantially perpendicular to the inlet axis.

In another preferred form, proximate to the valve port, each of the plurality of discrete flow channels is oriented at an angle of between approximately 15 degrees and approximately 45 degrees relative to the valve port.

In another preferred form, a trim assembly is arranged in the valve body, the trim assembly including a valve seat and a seat retainer, the valve seat defining the valve port, the seat retainer seated against the valve seat to retain the valve seat in position, wherein the seat retainer includes a converging surface that directs fluid toward the valve port.

In another preferred form, the trim assembly further includes a valve plug movably disposed within the seat retainer relative to the valve seat to control fluid flow through the valve body, the valve plug comprising a converging surface.

DETAILED DESCRIPTION

The present disclosure is directed to an improved fluid control valve that is operable to choke fluid flow and overcomes the above-described problems and other problems with known fluid control valves that operate to choke fluid flow. The fluid control valve of the present disclosure includes a plurality of discrete flow channels that are specifically arranged to direct fluid flow to the entire perimeter of a valve port of the valve, such that fluid is evenly distributed (or at least much more evenly distributed) to the valve port. As a result, the fluid control valve described herein minimizes, if not eliminates, the swirling effect that otherwise occurs during operation, such that flow velocity is substantially the same around the entire perimeter of the valve port. This, in turn, leads to a more balanced or uniform pressure profile, such that the fluid control valve of the present disclosure can choke fluid flow at a lower overall pressure drop than would be possible with conventional control valves that choke fluid flow (e.g., the control valve 100 described above).

FIGS. 3-11 illustrate one example of a fluid flow control device 300 constructed in accordance with the principles of the present disclosure. The fluid flow control device 300 in this example takes the form of a sliding-stem type control valve that is operable to choke fluid flow and generally includes a valve body 304 and a trim assembly 308 arranged in the valve body 304. While not illustrated, the fluid flow control device also includes a bonnet assembly coupled (e.g., fastened) to the valve body 304. The bonnet assembly can, as is known in the art, include valve packing, one or more packing rings, and one or more packing flanges.

Figure 1:
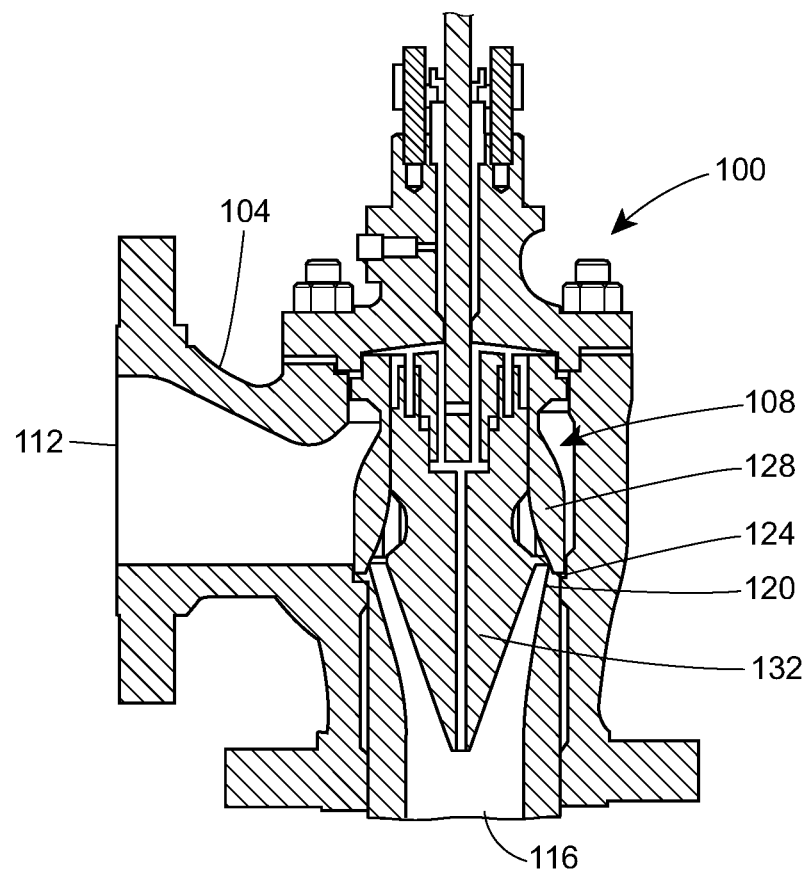
FIG. 1 is a cross-sectional view of a conventional control valve that is operable in a choked flow condition.
Figure 2:
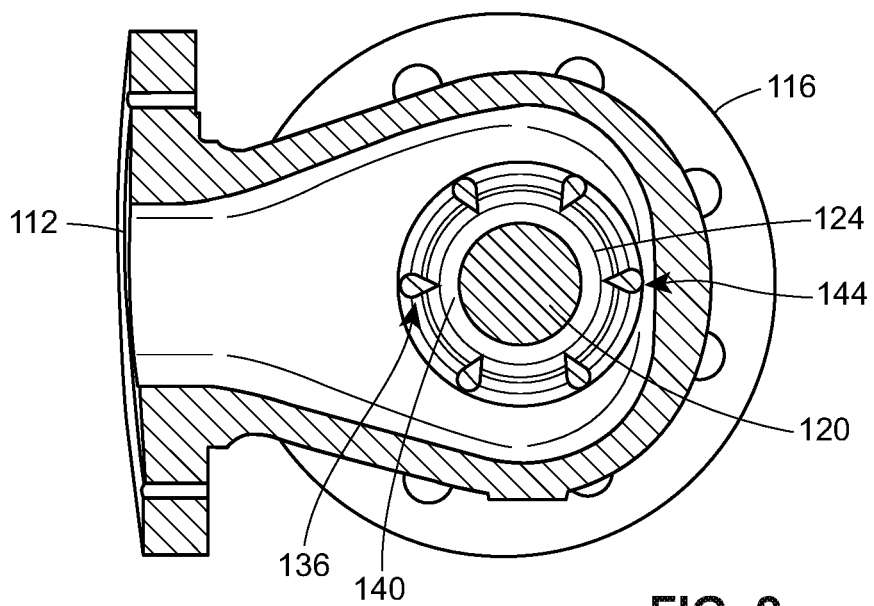
FIG. 2 is a cross-sectional view of a valve port of the conventional control valve of FIG. 1.
Figure 3:
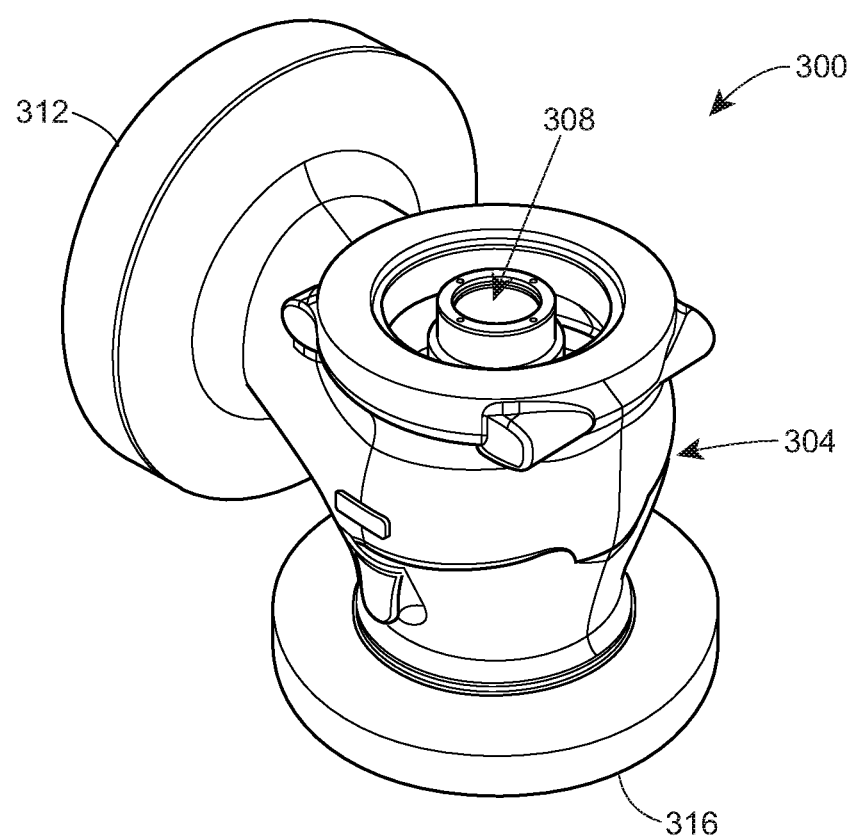
FIG. 3 is a perspective view of one example of a fluid control valve constructed in accordance with the teachings of the present invention.
Figure 4:
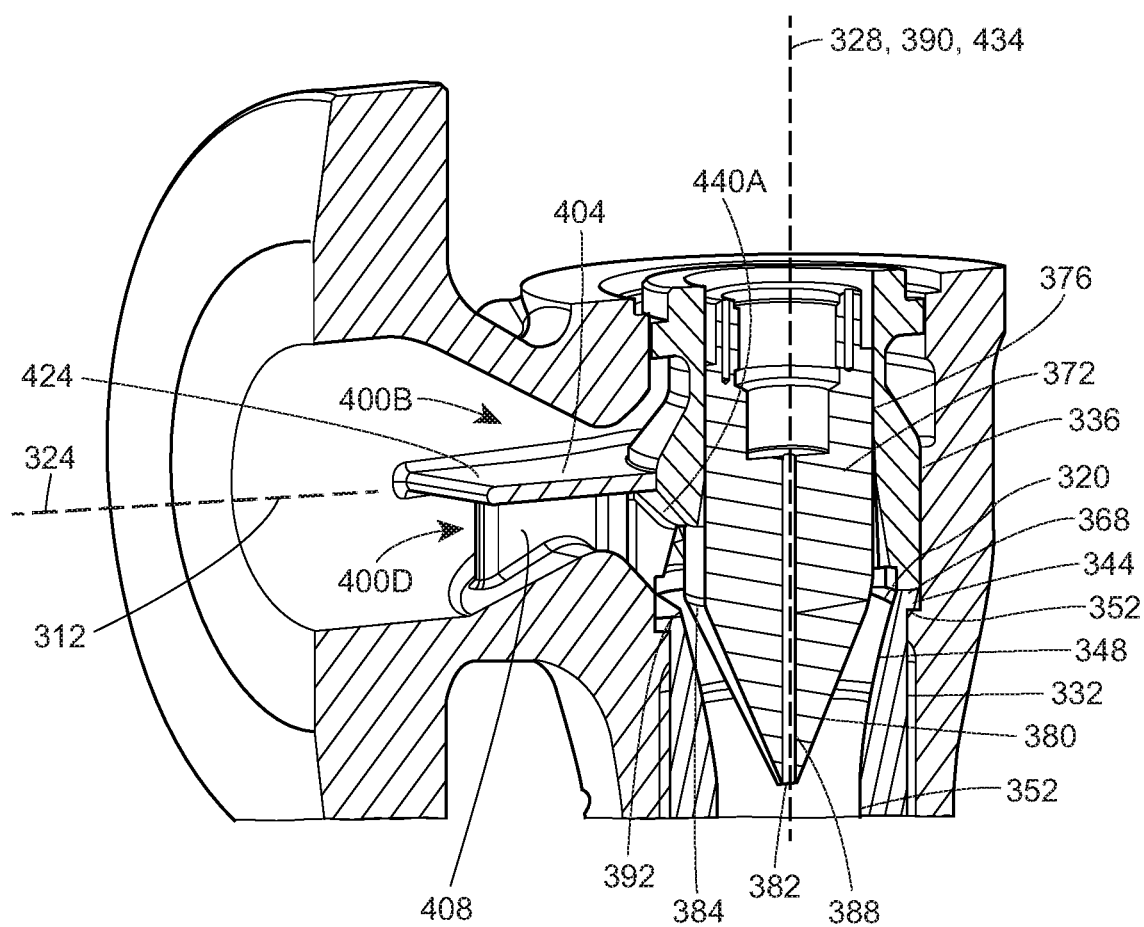
FIG. 4 is a cross-sectional view of the control valve of FIG. 3, showing a portion of the valve body and a trim assembly arranged in the valve body.

As best illustrated in FIGS. 3 and 4, the valve body 304 defines an inlet 312, an outlet 316, and a valve port 320 that extends between and fluidly couples the inlet 312 and the outlet 316. In this example, the inlet 312 is oriented along an inlet axis 324 (see FIG. 4) and the outlet 316 is oriented along an outlet axis 328 substantially perpendicular to the inlet axis 324 (see FIG. 4). In other examples, however, this need not be the case (e.g., the outlet axis 328 can be at some other angle relative to the inlet axis 324). The valve port 320 in this example has a substantially annular or circular cross-section. In other examples, however, the valve port 320 can vary in size and/or shape (e.g., can have a rectangular cross-section).

Figure 5:
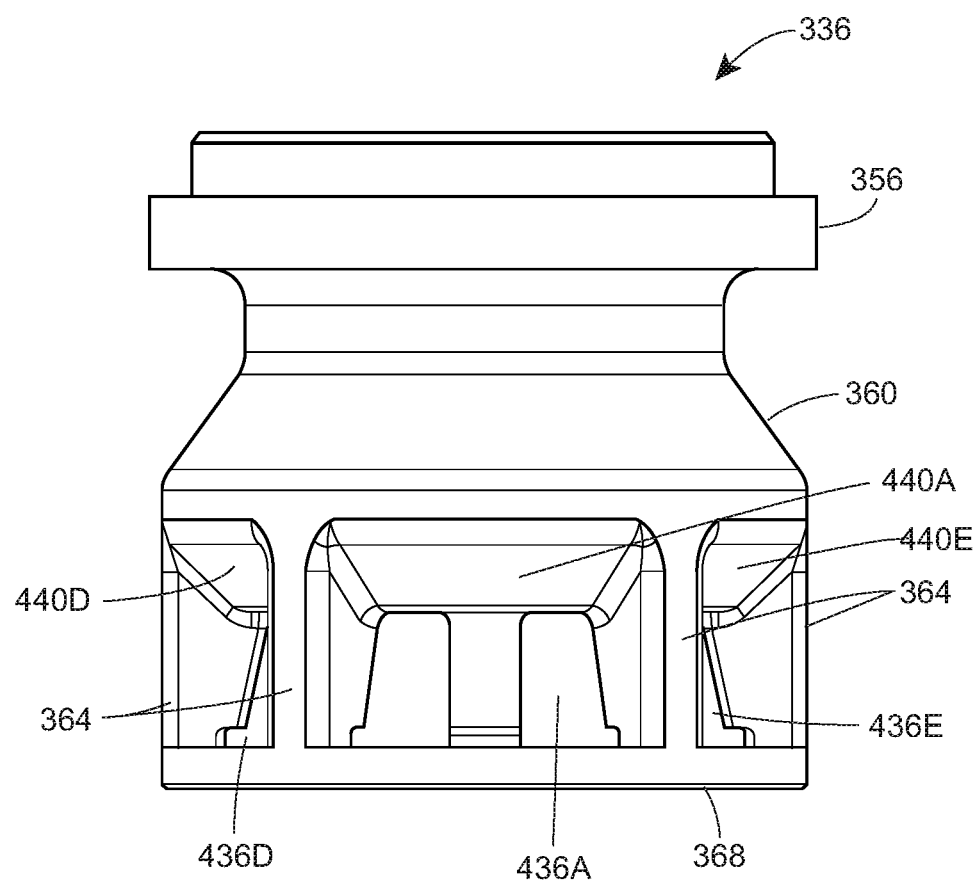
FIG. 5 is a front view of a seat retainer of the trim assembly of FIG. 4.
Figure 6:
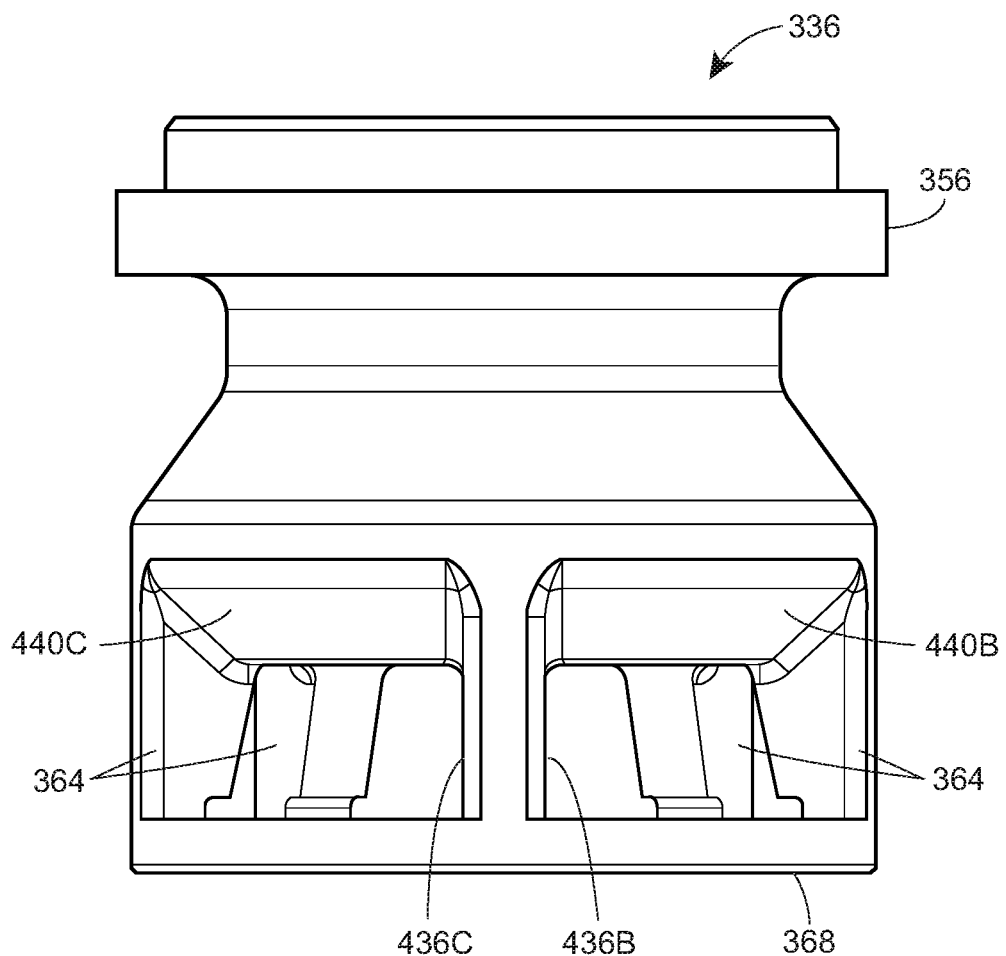
FIG. 6 is a rear view of the seat retainer of FIG. 5.
Figure 7:
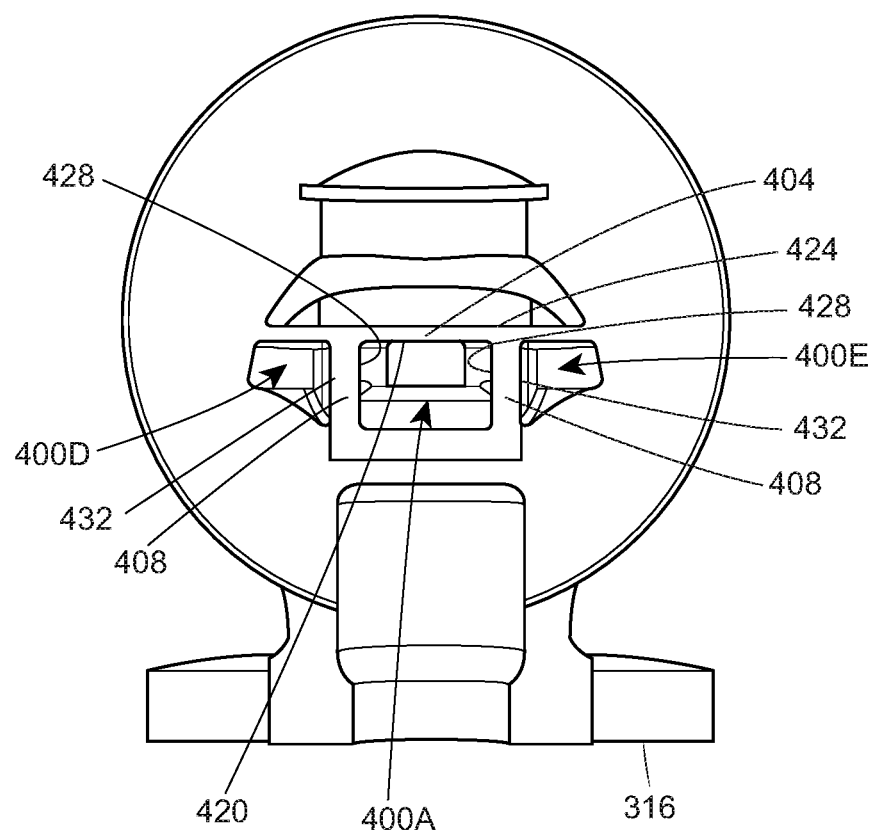
FIG. 7 is a plan view from an inlet of the control valve of FIG. 3, showing a plurality of discrete flow channels formed in the valve body.
Figure 8:
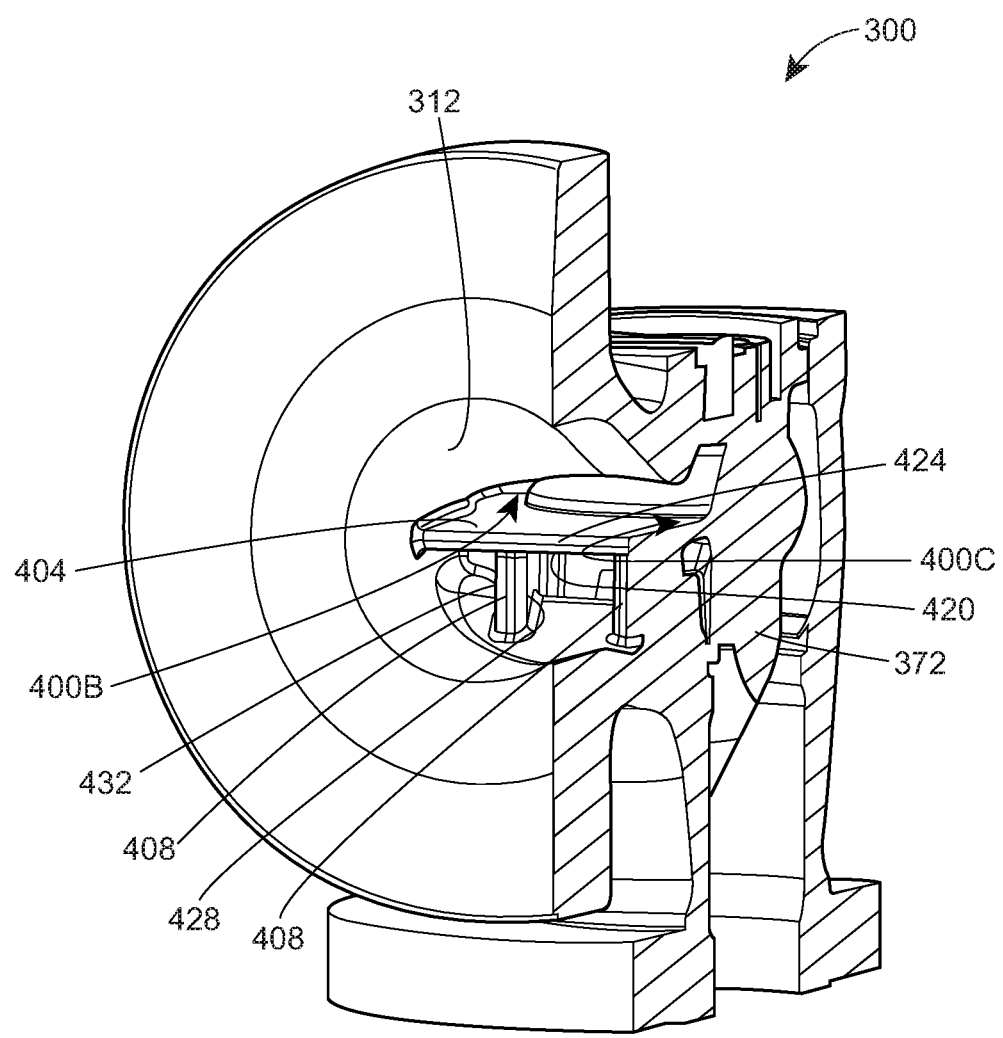
FIG. 8 is a partial, cross-sectional view of a portion of the control valve of FIG. 3, showing the plurality of discrete flow channels.
Figure 9:
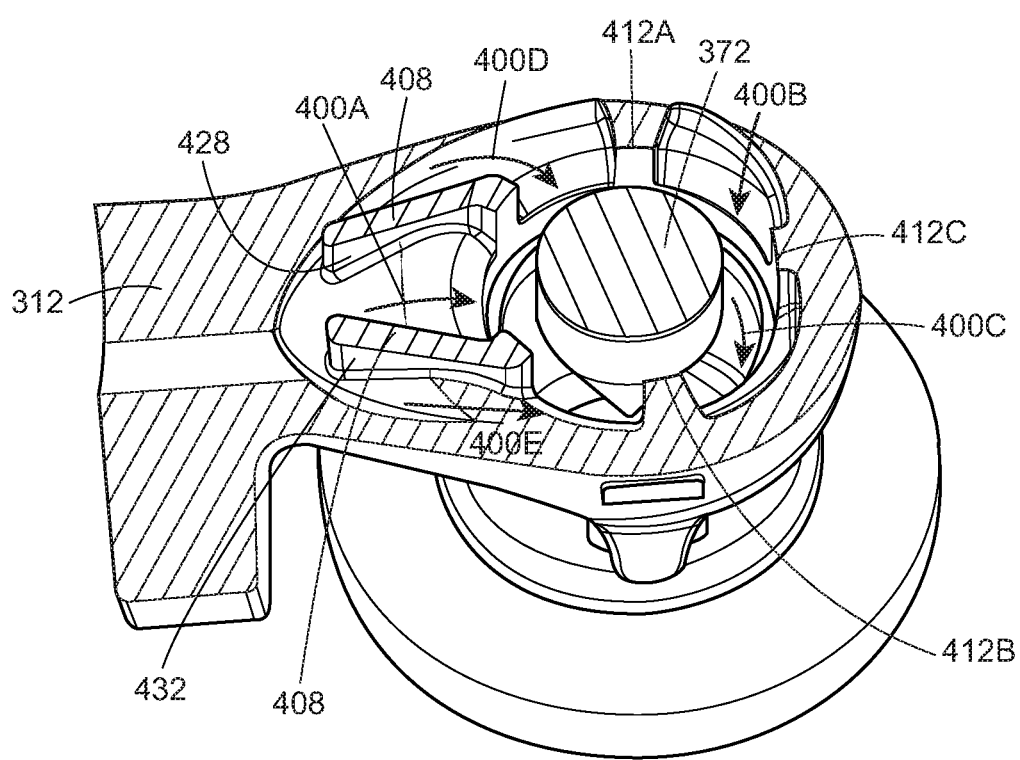
FIG. 9 is a perspective, cross-sectional view of a portion of the control valve of FIG. 3, showing the plurality of discrete flow channels but with the seat retainer removed for clarity.

As illustrated in FIG. 4, the trim assembly 308 includes a valve seat 332 and a seat retainer 336. The valve seat 332 in this example takes the form of a seat ring having an annular shelf 344 and a converging portion 348 extending outward (in this case, downward) from the annular shelf 344. The annular shelf 344 is seated against an annular shoulder 352 of the valve body 304, such that the valve seat 332 is retained within the valve port 320. The seat retainer 336, meanwhile, secures the valve seat 332 in position within the valve port 320. As best illustrated in FIGS. 5 and 6, the seat retainer 336 in this example includes an upper body portion 356, a skirt portion 360, a plurality of supports 364, and a securement ring 368. The upper body portion 356 has a cylindrical shape and is secured proximate the bonnet assembly (again, not shown) that is coupled to the valve body 304. The skirt portion 360 extends axially and radially away from the upper body portion 356 and toward the supports 364, which serve to connect the skirt portion 360 with the securement ring 368. The securement ring 368 has an annular shape and is seated against the annular shelf 344 of the valve seat 332, thereby clamping the valve seat 332 in position, as shown in FIG. 4.

As also illustrated in FIG. 4, the trim assembly 308 also includes a fluid flow control member, which in this example takes the form of a valve plug 372. The valve plug 372 in this example has a substantially cylindrical first portion 376, a second portion 380 that extends outward (downward, in this case) from the first portion 376 and converges or tapers to a point 382, and a seating surface 384 defined at the intersection of the first and second portions 376, 380. A passageway 388 is formed through a central portion of the valve plug 372 such that the valve plug 372 is "balanced". The valve plug 372 is movably disposed within the retainer 336, relative to the valve seat 332 and along a longitudinal axis 390 (which is co-axial with the outlet axis 328), to control fluid flow through the valve port 320 (and, more generally, the valve body 304). While not illustrated, the valve plug 372 is coupled to one end of a valve stem arranged in the bonnet assembly and partially arranged in the valve body 304. The other end of the valve stem (again not shown) is coupled to an actuator, e.g., an electric actuator, such that the actuator controls movement of the valve plug 372 (via the valve stem). Accordingly, the valve plug 372 can be moved between a closed position, wherein the seating surface 384 of the valve plug 372 sealingly engages a portion of the valve seat 332 (e.g., a portion of the converging portion 348), thereby preventing fluid flow through the valve port 320, and an open position, wherein the seating surface 374 of the valve plug 372 is spaced from this portion of the valve seat 332, thereby allowing fluid flow through the valve port 320.

Turning specifically to FIGS. 4 and 7-11, the valve body 304 also includes a plurality of discrete flow channels 400 that are arranged between the inlet 312 and the valve port 320 to facilitate a substantially even distribution of fluid flow to the valve port 320. The valve body 304 in this example includes five (5) discrete flow channels 400A-400E, which may also be referred to as vanes, defined or formed by various portions of the valve body 304, including a lateral wall 404, a pair of spaced longitudinal walls 408, and a plurality of ribs 412A, 412B, and 412C, each being arranged between the inlet 312 and the valve port 320. In other examples, the valve body 304 can include more or less discrete flow channels (e.g., three flow channels, seven flow channels, nine flow channels) and/or the flow channels can be defined or formed differently (e.g., by different features, different combinations of features).

The lateral wall 404 extends in a direction parallel to the inlet axis 324 and the longitudinal axis 390, while the longitudinal walls 408 intersect the lateral wall 404, and, as such, extend in a direction parallel to the outlet axis 328 and the longitudinal axis 390. The ribs 412A, 412B, and 412C protrude radially inward from the valve body 304 in a direction toward the valve port 320. More specifically, the ribs 412A and 412B protrude radially inward from the valve body 304 toward opposing side portions 416A, 416B of the perimeter of the valve port 320, while the rib 412C is spaced between the ribs 412A, 412B and protrudes radially inward from the valve body 304 toward a rear portion 416C of the perimeter of the valve port 320. As a result, the ribs 412A, 412B, and 412C are circumferentially spaced apart about the perimeter of the valve port 320 and the valve plug 372.

Figure 10:
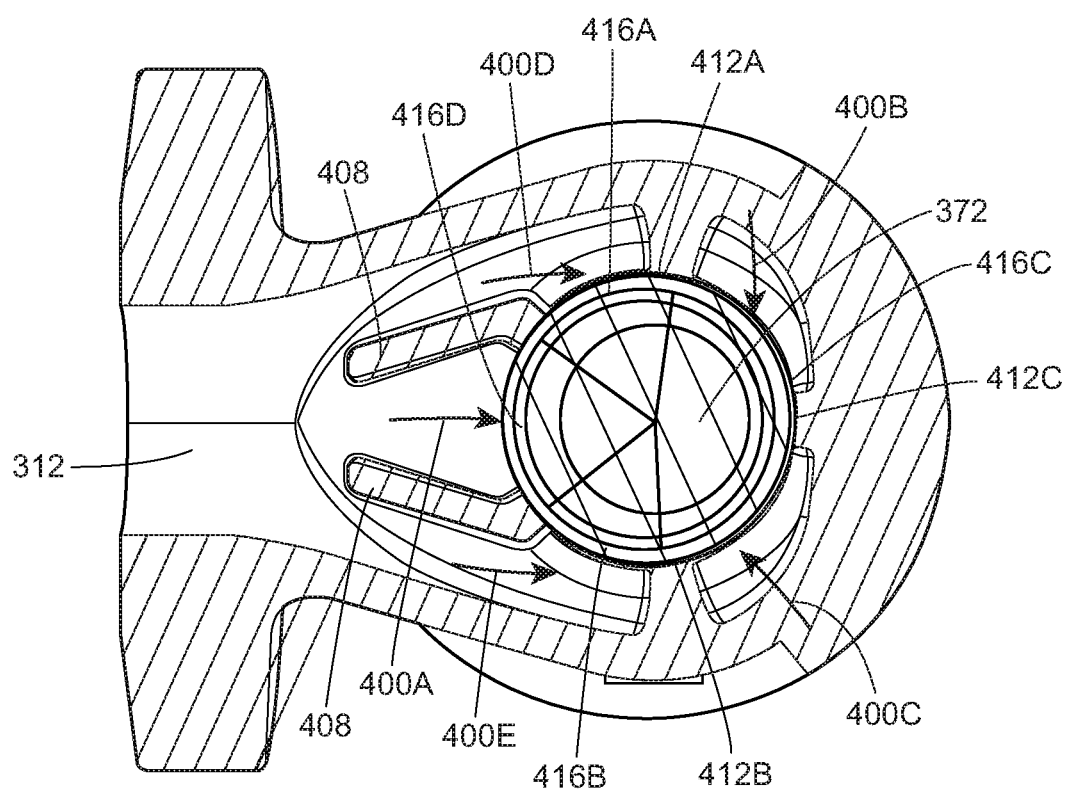
FIG. 10 is a top view of FIG. 9.

It will be appreciated that in this example, the delineated arc portions of the annular valve port 320 illustrated in FIG. 10 constitute the side, rear, and front portions 416A-416D of the valve port 320. In other examples, however, the side, rear, and front portions of the valve port 320 may refer to other portions of the valve port 320 and/or can vary in shape and/or size. As an example, the rear portion 416C can refer to an arc that constitutes a quarter of the perimeter of the valve port 320.

As best illustrated in FIGS. 4 and 7-11, the first, fourth, and fifth discrete flow channels 400A, 400D, and 400E are defined or formed by an underside 420 of the wall 404 (the underside 420 faces the outlet 316), while the second and third discrete flow channels 400B, 400C are defined or formed by a top side 424 of the wall 404 opposite the underside 420. More specifically, (i) the first flow channel 400A is defined by and between the underside 420 of the wall 404 and inner sides 428 of the two longitudinal walls 408, respectively, (ii) the second flow channel 400B is defined by and between the top side 424 of the wall 404, the rib 412A, and the rib 412C, (iii) the third flow channel 400C, while somewhat difficult to see, is defined by and between the top side 424 of the wall 404, the rib 412B, and the rib 412C, (iv) the fourth flow channel 400D is defined by and between the underside 420 of the wall 404, an outer side 432 of one of the longitudinal walls 408, and the rib 412A, and (v) the fifth flow channel 400E is defined by and between the underside 420 of the wall 404, an outer side 432 of the other one of the longitudinal walls 408, and the rib 412B.

Figure 11:
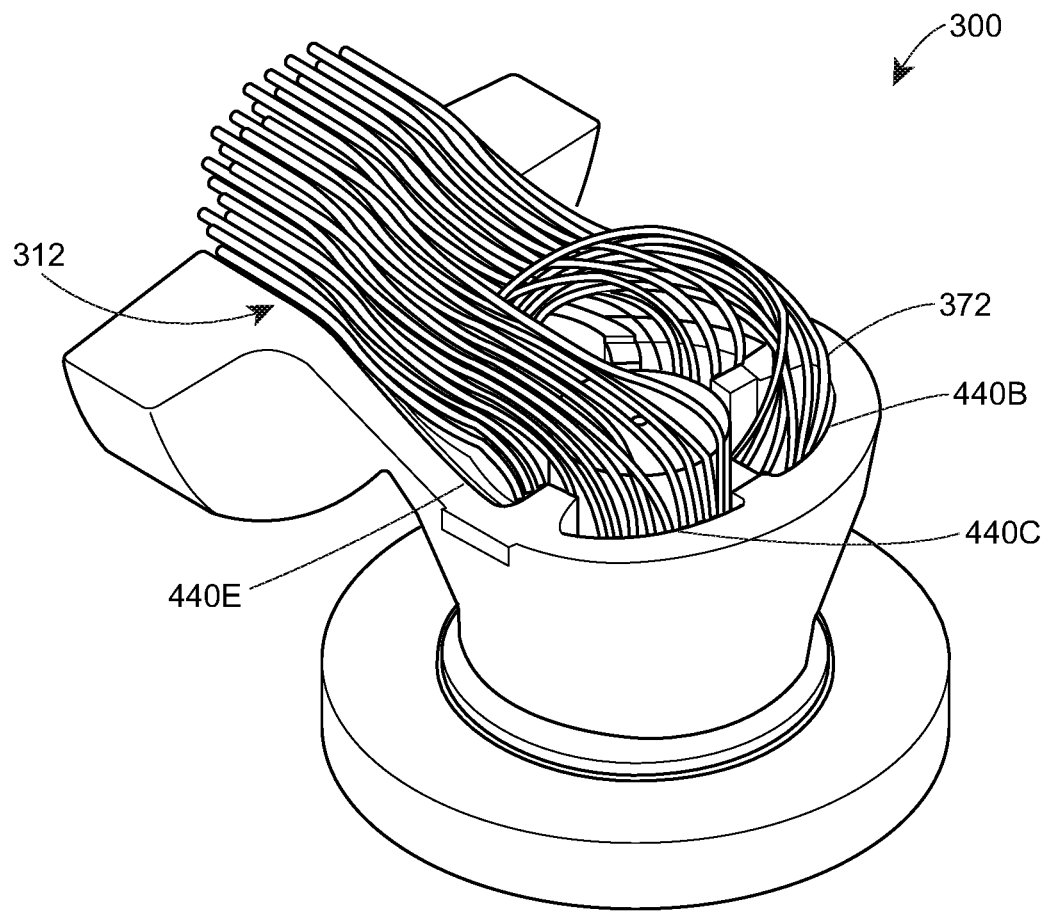
FIG. 11 illustrates a computational fluid dynamics (CFD) analysis of fluid flow through the plurality of discrete flow channels.

As best illustrated in FIGS. 4 and 11, the end portions of each of the flow channels 400A-400E (i.e., the portions of the flow channels 400A-400E proximate to the valve port 320) may be oriented at an angle of less than 90 degrees relative to the valve port 320 (particularly a throat 392 of the valve port 320). In some cases, the end portions of each of the flow channels 400A-400E may be substantially in-line, or parallel, with the valve port 320, and, more particularly, the throat 392 of the valve port 320. In other cases, such as illustrated in FIG. 4, the flow channels 400A-400E may, for example, be oriented at an angle of 5 degrees, 10 degrees, 20 degrees, 30 degrees, 40 degrees, 50 degrees, 60 degrees, 70 degrees, 80 degrees, some other angle less than 90 degrees, or any range of angles between any of these angles, relative to the valve port 320. In any event, orienting the end portions of the flow channels 400A-400E in the described manner helps to ensure that high velocity fluid approaching and entering the valve port 320 is not subject to any 90 degree turns, which would produce a pressure drop (and result in a loss of energy).

As discussed above, and with reference back to FIGS. 5 and 6, the trim assembly 308 in this example includes the seat retainer 336, which has, in relevant part, the skirt portion 360, the plurality of supports 364, and the securement ring 368. The seat retainer 336 in this example also includes five windows 436A-436E that are generally sized and shaped to correspond to the cross-section of the five discrete flow channels 400A-400E, respectively. In other examples, e.g., when the valve body 304 includes more or less than five channels, the seat retainer 336 can include more or less windows. As illustrated, the windows 436A-436E are defined by and between the skirt portion 360, adjacent supports 364, and the securement ring 368. The seat retainer 336 in this example also includes five flow guiding surfaces 440A-440E immediately proximate (in this case above) a respective one of the five windows 436A-436E. In other examples, e.g., when the seat retainer 336 includes more or less than five windows, the seat retainer 336 can include more or less than five flow guiding surfaces (even none at all). As illustrated, the five flow guiding surfaces 440A-440E extend radially inwardly from the skirt portion 360 and extend between adjacent supports 364. The five flow guiding surfaces 440A-440E are generally oriented at an angle of less than 90 degrees relative to the end portions of each of the flow channels 400A-400E. In the illustrated example, the five flow guiding surfaces 440A-440E are oriented at an angle of between approximately 30 degrees and approximately 45 degrees, but in other examples, the five flow guiding surfaces 440A-440E may be oriented at another angle (e.g., may be substantially in-line or parallel with the end portions of each of the flow channels 400A-400E). Therefore, when the seat retainer 336 is seated in the valve body 304 such that the windows 436A-436E of the retainer 336 are substantially aligned with the flow channels 400A-400E, respectively, the five flow guiding surfaces 440A-440E are positioned to help guide or direct fluid flow downward, into the valve port 320, in a manner that facilitates a smoother fluid distribution to the valve port 320.

When the fluid flow control valve 300 is in operation, the first flow channel 400A directs a first amount of fluid flowing through the inlet 312 through the window 436A and to a front portion 416D of the valve port 320 located between the opposing side portions 416A, 4168, the second and third flow channels 400B, 400C direct a second and third amount, respectively, of fluid flowing through the inlet 312 through the windows 436B, 436C, respectively, and to the rear portion 416C of the valve port 320, the fourth flow channel 400D directs a fourth amount of fluid flowing through the inlet 312 through the window 436D and to the first side portion 416A of the valve port 320, and the fifth flow channel 400E directs a fifth amount of fluid flowing through the inlet 312 through the window 436E and to the second side portion 4168 of the valve port 320, as illustrated in the computational fluid dynamics (CFD) analysis shown in FIG. 11. The exact amount of fluid directed to each of the portions 416A-416D of the valve port 320 by the flow channels 400A-400E will of course vary depending upon the amount of fluid flowing through the inlet 312 and the exact dimensions of the flow channels 400A-400E, but generally speaking, the amount of fluid directed to the side portions 416A, 4168 of the valve port 320 will be equal to or greater than the amount of fluid directed to the front portion 416D of the valve port 320, and the amount of fluid directed to the rear portion 416C of the valve port 320 will be equal to or greater than the amount of fluid directed to the front portion 416D of the valve port 320.

As confirmed by the results of the CFD analysis shown in FIG. 11, the flow channels 400A-400E offer similar, if not equal, levels of flow restriction, such that the flow channels 400A-400E serve to substantially evenly distribute fluid flow to the entire perimeter of the valve port 320 (or at the very least, more evenly distribute fluid flow than the flow valve 100 and other known flow valves). Thus, the amount of fluid flowing through the valve port 320 at or through the front portion 416D of the valve port 320 is less than the amount of fluid flowing through the valve port 320 at or through the rest of the valve port 320 (i.e., the rear and side portions 416A-416C of the valve port 320). As a result, the swirling effect that occurs during operation of the known control valve 100 is minimized, if not eliminated, such that the flow velocity is substantially the same around the entire perimeter of the valve port 320, as also confirmed by the CFD analysis of FIG. 11. This, in turn, minimizes, if not eliminates, the pressure differential that is observed during operation of the control valve 100. Accordingly, the flow control valve 300 described herein provides or achieves a more balanced or uniform pressure profile than the control valve 100 and other known flow control valves.

FIGS. 12-17 illustrate another example of a fluid flow control device 1200 constructed in accordance with the principles of the present disclosure. The fluid flow control device 1200 in this example is similar to the fluid flow control device 300 described above, in that it is a sliding-stem type control valve operable to choke fluid flow and includes a valve body 1204 and a trim assembly 1208 arranged in the valve body 1204. However, the fluid flow control device 1200 is different from the fluid flow control device 300 in ways that will be described below.

Figure 12:
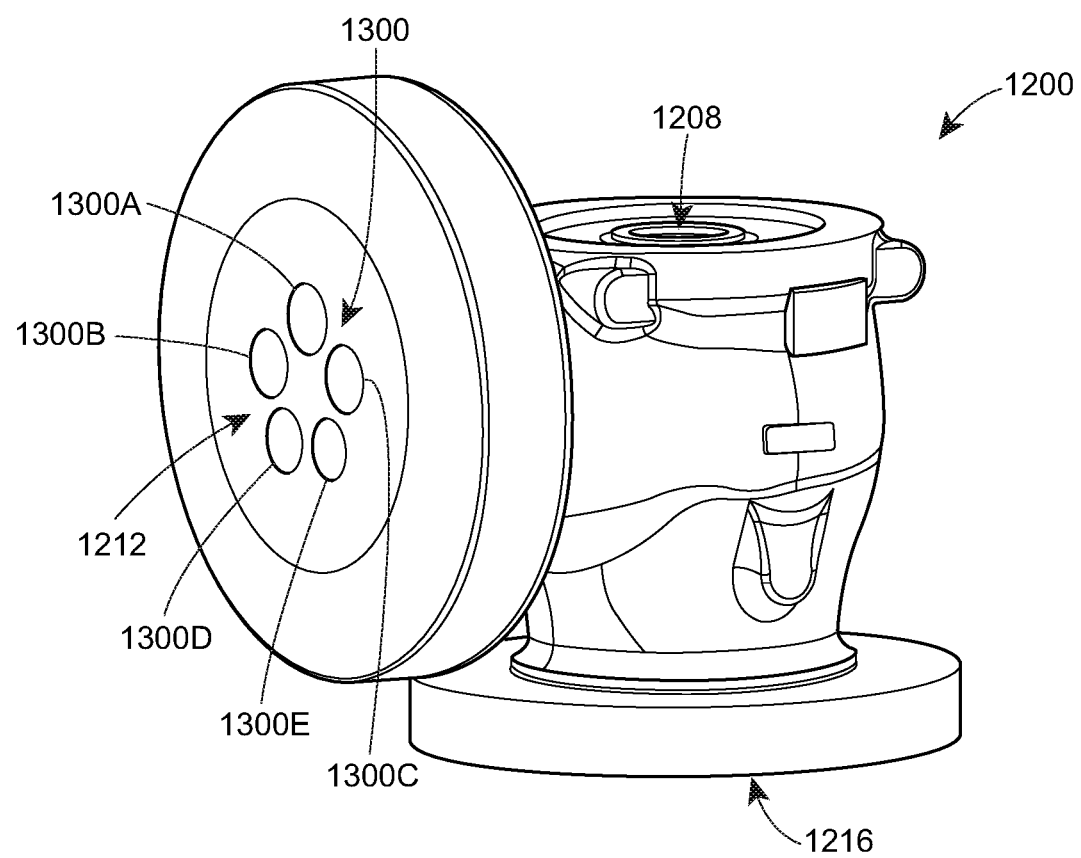
FIG. 12 is a perspective view of another example of a control valve constructed in accordance with the teachings of the present invention, the control valve having a valve body that includes a plurality of discrete flow channels.
Figure 13:
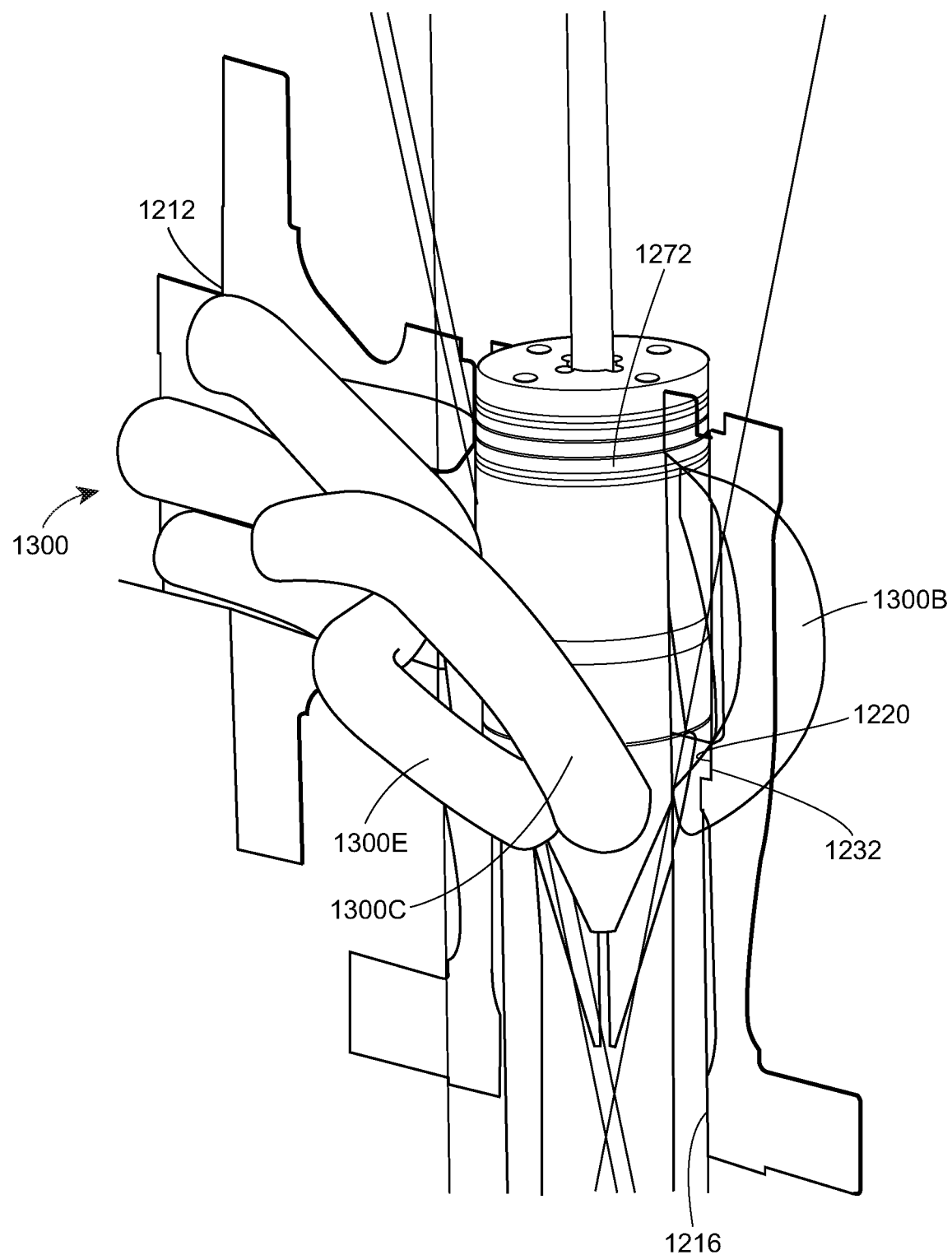
FIG. 13 illustrates the control valve of FIG. 12 but with the components of the control valve, except for the plurality of discrete flow channels and a valve plug of a trim assembly of the control valve, shown in outline.

As best illustrated in FIGS. 12 and 13, the valve body 1204 defines an inlet 1212, an outlet 1216, and valve port 1220 that are identical to the inlet 312, the outlet 316, and the valve port 320, respectively, described above. The trim assembly 1208 includes a valve seat 1232 that is identical to the valve seat 332 described above, but does not, at least in this example, include a seat retainer (e.g., the seat retainer 336). Thus, instead of being clamped in place (as the valve seat 332 is), the valve seat 1232 is welded or otherwise fixedly secured (e.g., fastened) to the valve body 1204 in the desired position. The trim assembly 1208 also includes a fluid flow control member, which in this example takes the form of a valve plug 1272 that is identical to the valve plug 372.

With reference to FIGS. 12-16, the valve body 1204, like the valve body 304, also includes a plurality of discrete flow channels 1300 that are arranged between the inlet 1212 and the valve port 1220 to facilitate a substantially even distribution of fluid flow to and through the valve port 1220. The discrete flow channels 1300 are, however, different from the discrete flow channels 400 described above. Unlike the plurality of discrete flow channels 400, which are defined or formed by various portions of the valve body, the plurality of discrete flow channels 1300 are hollow passages that are formed when the valve body 1204 is cast. In this example, the valve body 1204 includes five integrally formed channels 1300A-1300E. In other examples, the valve body 1204 can include more or less channels. Moreover, in other examples, the channels can be separately manufactured, e.g., tubular passageways manufactured from or using a different material than the material used to form the valve body 1204 (e.g., a material that is more thermally conductive and/or less susceptible to corrosion), and then disposed in the valve body 1204. As an example, the valve body 1204 can be manufactured from carbon steel, while the channels, in the form of tubular passageways, can be manufactured from aluminum and then arranged in the valve body 1204 in the desired location.

Figure 14:
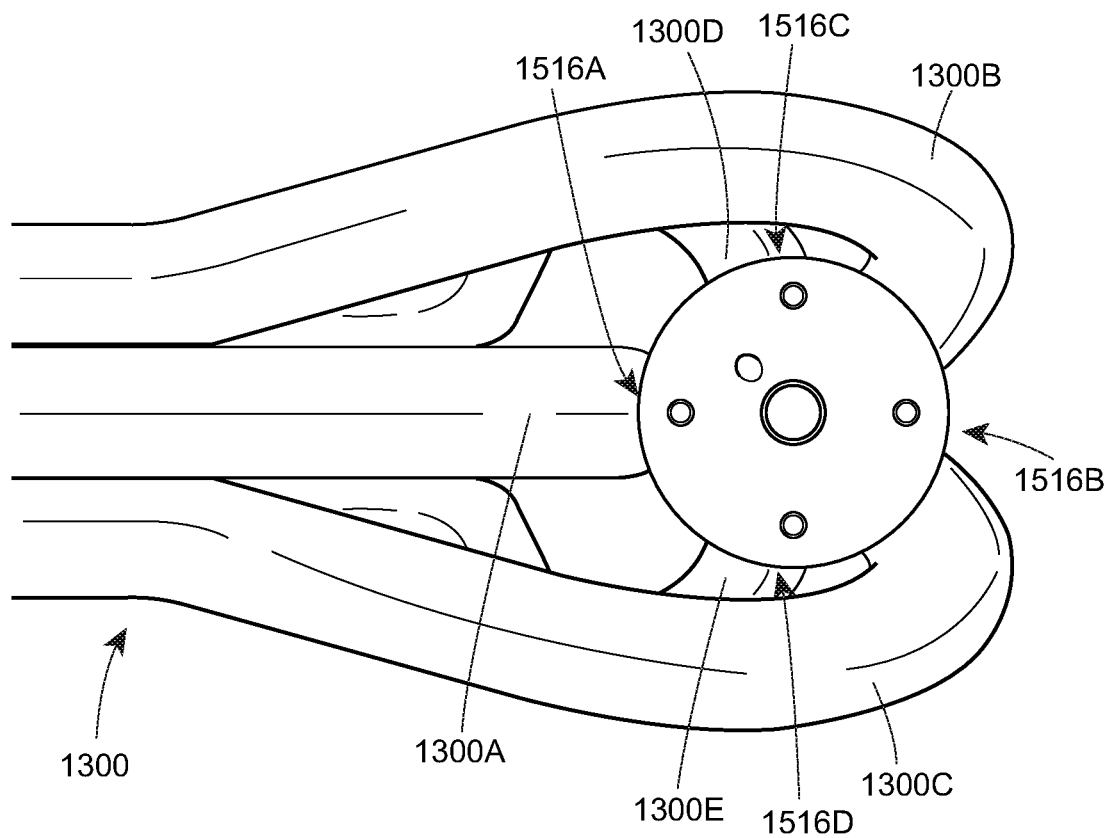
FIG. 14 is a top view of FIG. 13.
Figure 15:
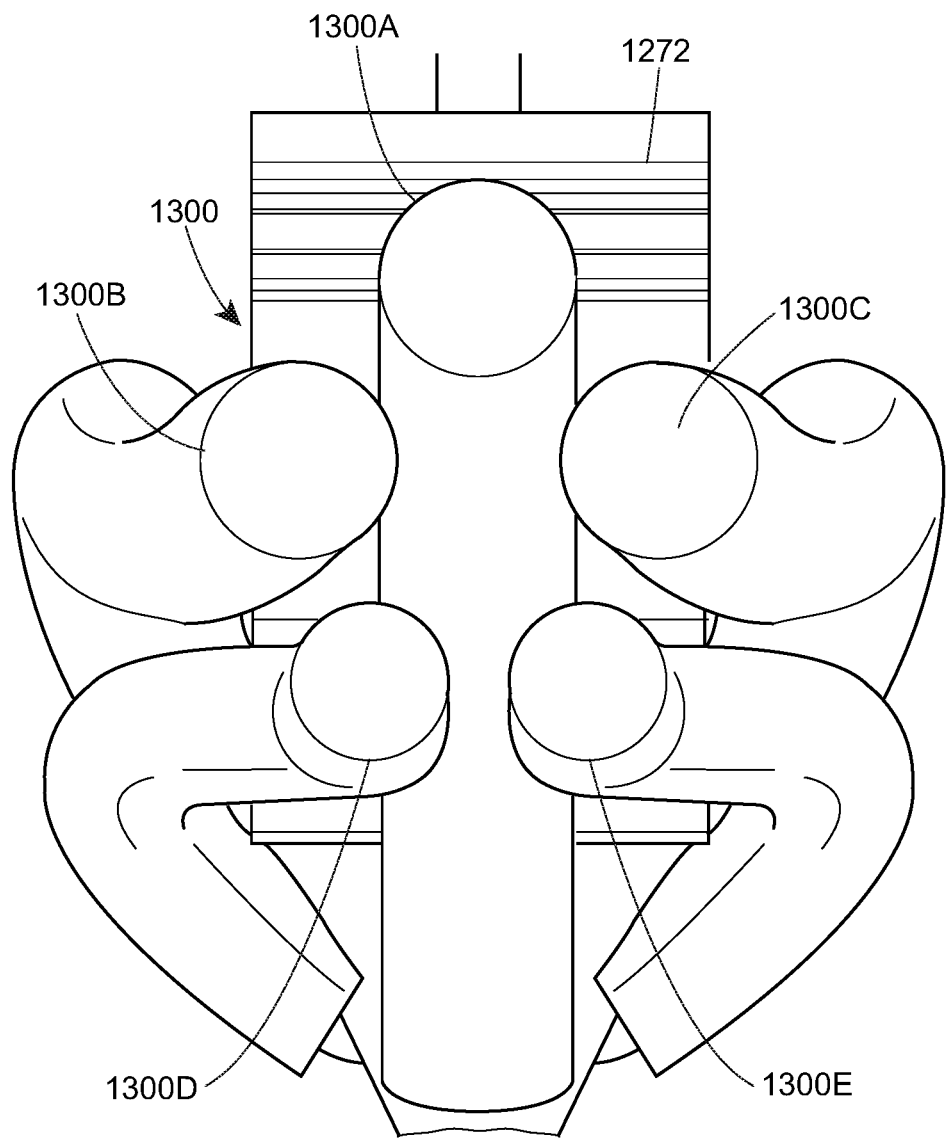
FIG. 15 is a view of FIG. 13 from an inlet of the control valve.
Figure 16:
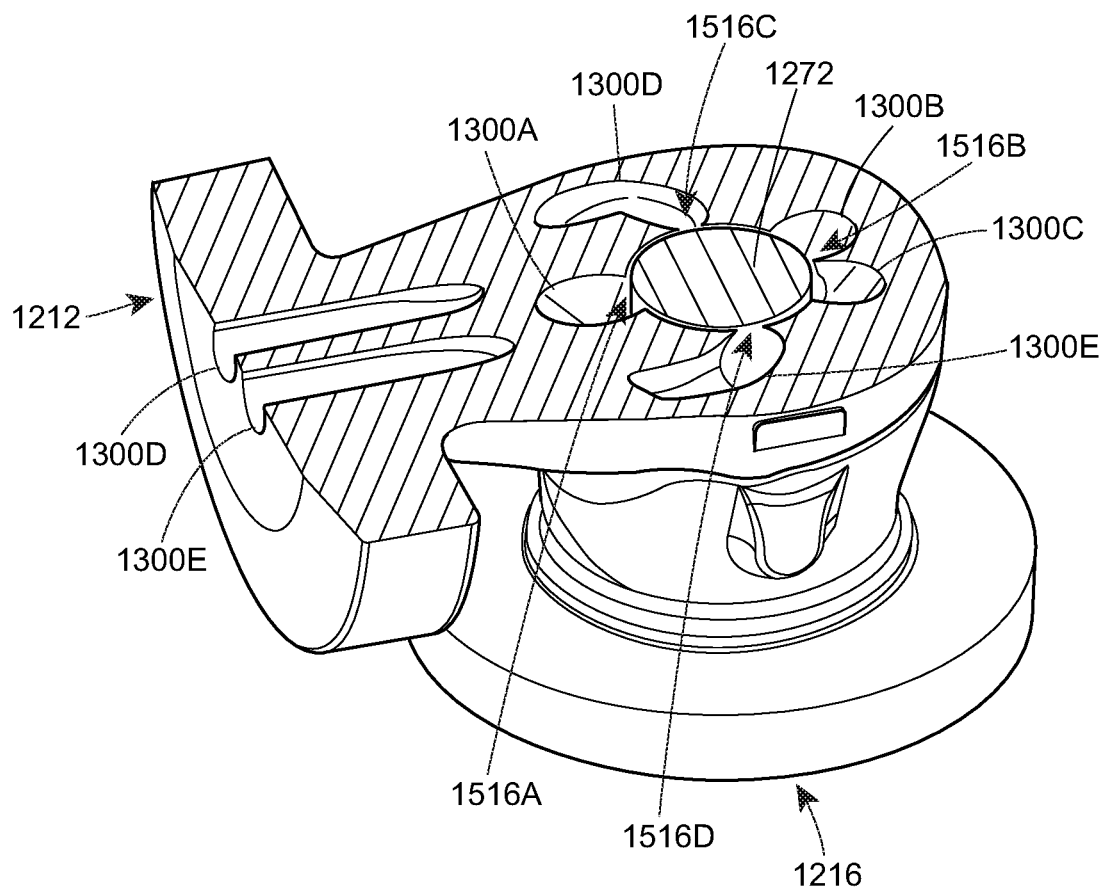
FIG. 16 is a cross-sectional view of the control valve, showing portions of the plurality of discrete flow channels.
Figure 17:
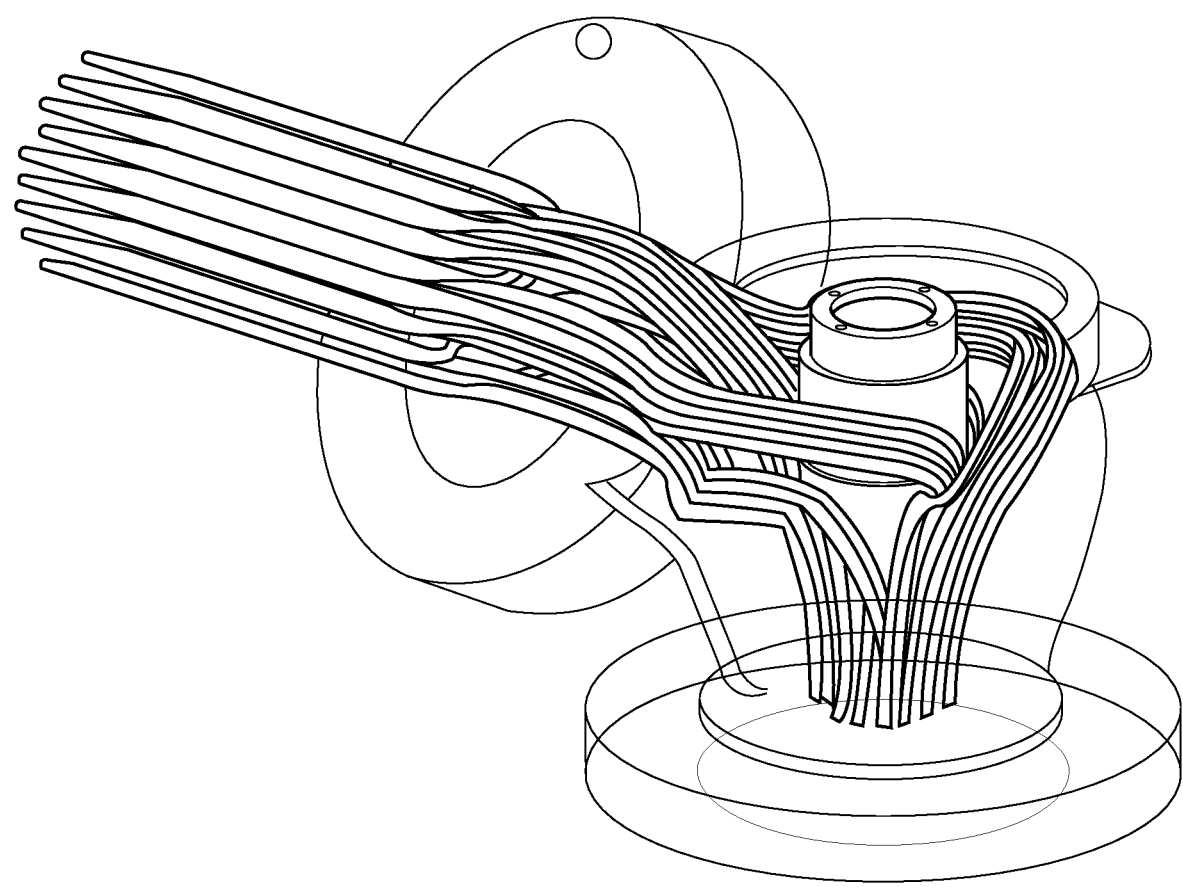
FIG. 17 illustrates a CFD analysis of fluid flow through the plurality of discrete flow channels.

As best illustrated in FIGS. 13-15, which depict the channels 1300A-1300E but show the remaining components of the valve body 1204 in outline (except for the valve plug 1272) so as to more clearly illustrate the channels 1300A-1300E, and FIG. 16, which shows portions of the channels 1300A-1300E proximate the valve port 1220, the first channel 1300A extends between the inlet 1212 and a front portion 1516A of the perimeter of the valve port 1220 (the front portion 1516A being identical to the front portion 416D described above), the second and third channels 1300B, 1300C each extend between the inlet 1212 and a rear portion 1516B of the perimeter of the valve port 1220 opposite the front portion 1516A (the rear portion 1516B being identical to the rear portion 416C described above), the fourth channel 1300D extends between the inlet 1212 and one of the side portions 1516C of the perimeter of the valve port 1220 located between the front and rear portions 1516A, 1516B (the side portion 1516C being identical to the side portion 416A), and the fifth channel 1300E extends between the inlet 1212 and the other side portion 1516D of the perimeter of the valve port 1220 (the side portion 1516D being identical to the side portion 416B). It will be appreciated that to get to the valve port 1220, the second and fourth channels 1300B, 1300D pass through one portion of the valve body 1204, while the third and fifth channels 1300C, 1300E pass through a portion of the valve body 1204 opposite the valve port 1220 from that portion.

In this example, each of the channels 1300A-1300E has a circular shape in cross-section, with the first channel 1300A having a cross-sectional area of approximately 1.49 in$^2$, the second channel and third channels 1300B, 1300C each having a cross-sectional area of approximately 1.20 in$^2$, and the fourth and fifth channels 1300D, 1300E each having a cross-sectional area of approximately 0.98 in$^2$. Of course, in other examples, the shape and/or size of the channels 1300A-1300E can vary to accommodate a different amount of fluid flow. As an example, the channels 1300A-1300E need not have a circular shape in cross-section, but can instead have a rectangular, triangular, irregular, or other shape in cross-section.

The channels 1300A-1300E are thus configured to direct fluid flow in a similar manner as the flow channels 400A-400E when the fluid flow control valve 1200 is in operation. More specifically, the first channel 1300A directs a first amount of fluid flowing through the inlet 1212 to the front portion 1516A of the perimeter of the valve port 1220, the second and third channels 1300B, 1300C direct a second and third amount, respectively, of fluid flowing through the inlet 1212 to the rear portion 1516B of the perimeter of the valve port 1220, the fourth channel 1300D directs a fourth amount of fluid flowing through the inlet 1212 to the first side portion 1516C of the perimeter of the valve port 1220, and the fifth channel 1300E directs a fifth amount of fluid flowing through the inlet 1212 to the second side portion 1516D of the perimeter of the valve port 1220, as illustrated in the CFD analysis shown in FIG. 17.

Generally speaking, such an arrangement produces a fluid distribution whereby the amount of fluid directed to the side portions 1516C, 1516D of the valve port 1220 is equal to or greater than the amount of fluid directed to the front portion 1516A of the valve port 1220, and the amount of fluid directed to the rear portion 1516B of the valve port 1220 is equal to or greater than the amount of fluid directed to the front portion 1516A of the valve port 1220. In this example, by virtue of the cross-sectional areas described above, the first amount of fluid (directed by the first channel 1300A) is equal to approximately 24% of total fluid flowing through the inlet 1212, the second amount of fluid (directed by the second channel 1300B) is equal to approximately 21% of the total fluid flowing through the inlet 1212, the third amount of fluid (directed by the third channel 1300C) is also equal to approximately 21% of the total fluid flowing through the inlet 1212, the fourth amount of fluid (directed by the fourth channel 1300D) is equal to approximately 17% of the total fluid flowing through the inlet 1212, and the fifth amount of fluid (directed by the fifth channel 1300E) is also equal to approximately 17% of the total fluid flowing through the inlet 1212. In other examples, the fluid distribution by the channels 1300A-1200E can vary, depending upon, for example, the shape and/or size of the flow channels 1300.

In doing so, the flow channels 1300A-1300E, like the flow channels 400A-400E, provide similar, if not equal, levels of flow restriction, such that the flow channels 1300A-1300E serve to substantially evenly distribute fluid flow to the entire perimeter of the valve port 1220 (or at the very least, more evenly distribute fluid flow than the flow valve 100 and other known choke flow valves). Thus, the amount of fluid flowing through the valve port 1220 at or through the front portion 1516A of the valve port 1220 is less than the amount of fluid flowing through the valve port 1220 at or through the rest of the valve port 1220 (i.e., the rear and side portions 1516A-1516C of the valve port 1220). As a result, the swirling effect that occurs during operation of the known control valve 100 is minimized, if not eliminated, such that the flow velocity is substantially the same around the entire perimeter of the valve port 1220, as confirmed by the CFD analysis of FIG. 17. This, in turn, produces a more balanced or uniform pressure profile. Accordingly, the flow control valve 1200 described herein is operable to choke fluid flow at a lower overall pressure drop than would be possible with the control valve 100 and other known choke flow control valves.

Finally, while the flow control valves 300, 1200 described herein are operable to choke fluid flow, it will be appreciated that the principles of the present disclosure can be applied to fluid flow control valves that do not choke fluid flow.

The invention claimed is:

1. A valve body for a fluid control valve, comprising:
   an inlet;
   an outlet;
   a valve port defined between the inlet and the outlet;
   a lateral wall extending into the inlet;
   a plurality of ribs that protrude radially inwardly toward the valve port; and
   a plurality of discrete flow channels formed by the lateral wall and the plurality of ribs and extending between the inlet and the valve port to distribute fluid flowing through the inlet to the valve port, the plurality of discrete flow channels comprising:
      one or more first flow channels arranged to direct a first amount of the fluid flowing through the inlet to a front portion of the valve port;
      one or more second flow channels arranged to direct a second amount of the fluid flowing through the inlet to a rear portion of the valve port opposite the front portion; and
      one or more third flow channels arranged to direct a third amount of the fluid flowing through the inlet to one or both side portions of the valve port extending between the front and rear portions.

2. The valve body of claim 1, wherein the plurality of discrete flow channels is non-removably formed in the valve body between the inlet and the valve port.

3. The valve body of claim 1, wherein the inlet is centered about an inlet axis and the outlet is centered about an outlet axis substantially perpendicular to the inlet axis.

4. The valve body of claim 1, wherein the plurality of discrete flow channels comprises a plurality of passages arranged between the inlet and the valve port.

5. The valve body of claim 1, wherein the plurality of discrete flow channels comprises one first flow channel, two second flow channels, and two third flow channels, and wherein the two third flow channels direct fluid flowing through the inlet to the side portions of the valve port, respectively.

6. The valve body of claim 1, wherein proximate to the valve port, each of the plurality of discrete flow channels is oriented at an angle of between approximately 15 degrees and approximately 45 degrees relative to the valve port.

7. A valve body for a fluid control valve, comprising:
an inlet centered about an inlet axis;
an outlet;
a valve port defined between the inlet and the outlet;
a lateral wall extending in a direction parallel to the inlet axis, wherein the lateral wall extends into the inlet;
a pair of longitudinal walls that intersect the lateral wall and extend in a direction perpendicular to the inlet axis; and
a plurality of discrete flow channels non-removably formed in the valve body, the plurality of discrete flow channels at least partially formed by the lateral wall and the pair of longitudinal walls, the plurality of discrete flow channels extending between the inlet and the valve port to distribute fluid flowing through the inlet to the valve port, the plurality of discrete flow channels comprising:
one or more first flow channels arranged to direct a first amount of the fluid flowing through the inlet to a front portion of the valve port;
one or more second flow channels arranged to direct a second amount of the fluid flowing through the inlet to a rear portion of the valve port opposite the front portion; and
one or more third flow channels arranged to direct a third amount of the fluid flowing through the inlet to one or both side portions of the valve port extending between the front and rear portions,
wherein the one or more first flow channels define a first total flow area that is less than each of a second total flow area defined by the one or more second flow channels and a third total flow area defined by the one or more third flow channels.

8. The valve body of claim 7, wherein the inlet has a converging portion, and wherein the lateral wall has an end portion positioned in the converging portion of the inlet.

9. The valve body of claim 7, wherein the lateral wall has an end portion positioned further from the valve port than the longitudinal walls.

10. The valve body of claim 7, further comprising a plurality of ribs that protrude radially inwardly toward the valve port, wherein the plurality of discrete flow channels is non-removably formed in the valve body by the lateral wall, the pair of longitudinal walls, and the plurality of ribs.

11. The valve body of claim 7, wherein the plurality of discrete flow channels comprises a plurality of passages arranged between the inlet and the valve port.

12. The valve body of claim 7, wherein the plurality of discrete flow channels comprises one first flow channel, two second flow channels, and two third flow channels, and wherein the two third flow channels direct fluid flowing through the inlet to the side portions of the valve port, respectively.

13. The valve body of claim 7, wherein the pair of longitudinal walls are parallel to one another.

14. The valve body of claim 7, wherein the pair of longitudinal walls are non-removably formed in the valve body.

15. The valve body of claim 7, wherein the pair of longitudinal walls extend into the inlet.

16. A fluid flow control valve, comprising:
a valve body defining an inlet, an outlet, and a valve port between the inlet and the outlet;
a plurality of discrete flow channels non-removably formed in the valve body and extending between the inlet and the valve port to distribute fluid flowing through the inlet to the valve port, the plurality of discrete flow channels comprising:
one or more first flow channels arranged to direct a first amount of the fluid flowing through the inlet to a front portion of the valve port;
one or more second channels arranged to direct a second amount of the fluid flowing through the inlet to a rear portion of the valve port opposite the front portion; and
one or more third channels arranged to direct a third amount of the fluid flowing through the inlet to one or both side portions of the valve port extending between the front and rear portions;
a valve seat arranged in the valve body; and
a valve plug movably disposed in the valve body relative to the valve seat to control fluid flow through the valve body, the valve plug having an outer surface that converges,
wherein the valve body further comprises a lateral wall extending into the inlet, and wherein the plurality of discrete flow channels is at least partially formed by the lateral wall.

17. The fluid flow control valve of claim 16, wherein the inlet is centered about an inlet axis, and wherein the lateral wall extends in a direction parallel to the inlet axis.

18. The fluid flow control valve of claim 17, further comprising:
a pair of longitudinal walls that intersect the lateral wall and extend in a direction perpendicular to the inlet axis; and
a plurality of ribs that protrude radially inwardly from the valve body and toward the valve port, wherein the plurality of discrete flow channels is non-removably formed in the valve body by the lateral wall, the pair of longitudinal walls, and the plurality of ribs.

19. The fluid flow control valve of claim 16, wherein the inlet has a converging portion, and wherein the lateral wall has an end portion positioned in the converging portion of the inlet.

20. The fluid flow control valve of claim 16, wherein the outlet is centered about an outlet axis substantially perpendicular to the inlet axis.

* * * * *

UNITED STATES PATENT AND TRADEMARK OFFICE
CERTIFICATE OF CORRECTION

PATENT NO. : 11,300,215 B2
APPLICATION NO. : 16/672402
DATED : April 12, 2022
INVENTOR(S) : Jason G. Olberding et al.

It is certified that error appears in the above-identified patent and that said Letters Patent is hereby corrected as shown below:

In the Specification

At Column 1, Line 13, "2017," should be -- 2017, now Pat. No. 10,551,856, --.

At Column 5, Line 8, "the" should be -- to the --.

At Column 5, Line 55, "4128," should be -- 412B, --.

At Column 5, Line 66, "4128," should be -- 412B, --.

At Column 6, Line 2, "4128" should be -- 412B --.

At Column 6, Line 3, "4168" should be -- 416B --.

At Column 6, Line 5, "4128" should be -- 412B --.

At Column 6, Line 8, "4128," should be -- 412B, --.

At Column 6, Line 23, "4008," should be -- 400B, --.

At Column 6, Line 32, "4218," should be -- 412B, --.

At Column 6, Line 38, "4128." should be -- 412B. --.

At Column 7, Line 7, "a" should be -- to a --.

At Column 7, Line 34, "4168," should be -- 416B, --.

At Column 7, Line 44, "4168" should be -- 416B --.

Signed and Sealed this
Ninth Day of May, 2023

Katherine Kelly Vidal
*Director of the United States Patent and Trademark Office*

CERTIFICATE OF CORRECTION (continued)
U.S. Pat. No. 11,300,215 B2

At Column 7, Line 52, "416S" should be -- 416B --.

At Column 8, Line 66, "the" should be -- to the --.

At Column 9, Line 6, "1516S" should be -- 1516B --.

At Column 9, Line 17, "1300S," should be -- 1300B, --.

At Column 9, Line 24, "1300S," should be -- 1300B, --.

At Column 9, Line 40, "1300S," should be -- 1300B, --.

At Column 9, Line 42, "1516S" should be -- 1516B --.

At Column 9, Line 55, "1516S" should be -- 1516B --.

At Column 9, Line 62, "1300S)" should be -- 1300B) --.